[19] United States Patent
Makely

[11] 4,047,828
[45] Sept. 13, 1977

[54] CORE DRILL

[76] Inventor: Joseph E. Makely, 889 Colony Way, Worthington, OhioIO 43085

[21] Appl. No.: 672,475

[22] Filed: Mar. 31, 1976

[51] Int. Cl.[2] .......................... B23B 27/20; B28D 5/02

[52] U.S. Cl. .................................. 408/145; 125/30 R; 408/209

[58] Field of Search ............... 408/207, 208, 209, 145, 408/225; 125/30 R, 36, 20, 30 WD

[56] References Cited

U.S. PATENT DOCUMENTS

| | | | |
|---|---|---|---|
| 2,599,770 | 6/1952 | Marcerov | 408/145 X |
| 2,978,846 | 4/1961 | Barron | 408/145 X |
| 3,127,715 | 4/1964 | Christensen | 125/30 R |
| 3,190,278 | 6/1965 | Schluchter | 125/30 R |
| 3,647,310 | 3/1972 | Morse | 408/209 X |

*Primary Examiner*—Francis S. Husar
*Assistant Examiner*—William R. Briggs
*Attorney, Agent, or Firm*—Van D. Harrison, Jr.

[57] ABSTRACT

Disclosed is a core drill for cutting cylindrical sections from stone, glass, shell and other hard materials, while simultaneously drilling a centered hole in each cylindrical section. The drill comprises an abrasive tipped hollow cylindrical core drill and a drill bit positioned centrally within the core barrel.

4 Claims, 2 Drawing Figures

CORE DRILL

NATURE OF THE INVENTION

This invention relates to core barrels and drills for coring and drilling hard materials such as shell, glass, gem stone stock and the like.

BACKGROUND OF THE INVENTION

A popular form of jewelry is the heishi necklace made of tubular beads cut from turquoise, shell, coral, as well as other hard materials and strung in a desired pattern on a stringing cord. To cut these beads from hard materials it is necessary to drill the center hole and to shape the beads individually to the desired circular shape in separate steps.

A primary object of this invention is to provide an adjustable core drill and hole drill which can simultaneously cut both a cylindrically shaped bead and drill a hole in the center thereof.

DESCRIPTION OF THE DRAWINGS

In the accompanying drawings

SUMMARY OF THE INVENTION

Figure 1:
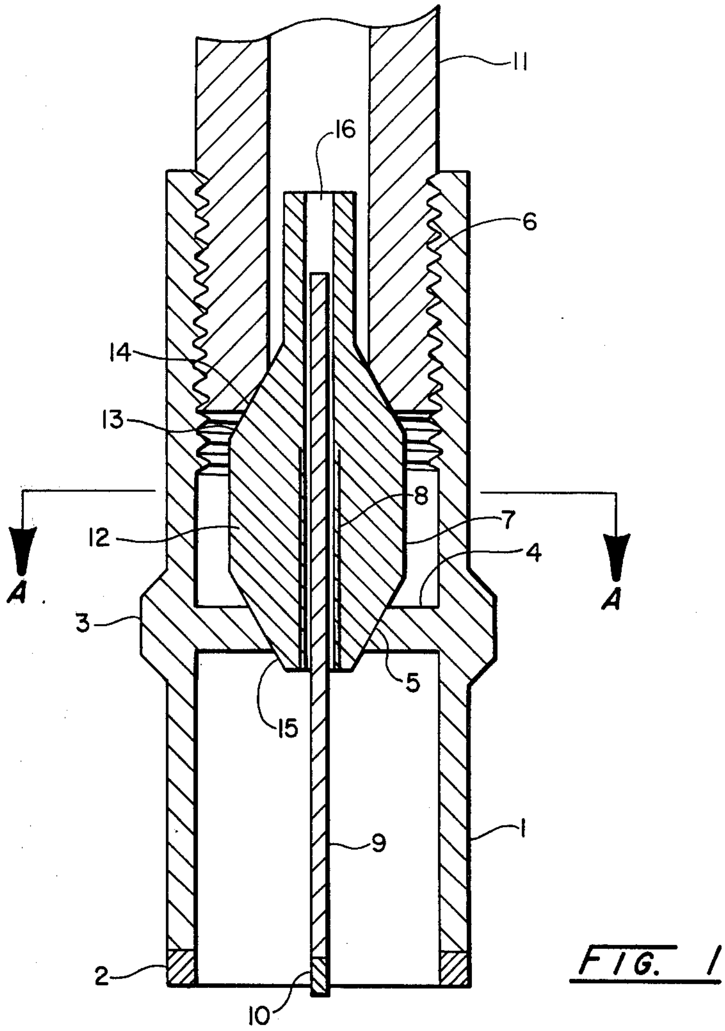
FIG. 1 represents a vertical cross-section of a preferred embodiment of the core drill of this invention.

Briefly stated this invention comprises a hollow abrasive-ended tubular core drill having positioned coaxially therein an abrasive tipped drill bit.

DESCRIPTION OF THE INVENTION

The core drill of this invention will be best understood by reference to the accompanying drawings. In the drawings reference numeral 1 denotes generally the core barrel (a rigid-walled tube) having on one end an abrasive cutting edge 2. Flats 3 provide a means of grasping the core barrel with a tool such as an open end wrench. Circular shoulder 4 extends into the interior of the core barrel and has a circular beveled edge 5. Tube 1 is internally threaded at 6. The abrasive cutting edge 2 at one end of barrel 1 preferably is made of a bonded aggregate of abrasive paticles such as flint, emery, garnet, aluminum oxide, silicon carbide, or cubic boron nitride. A preferred abrasive is diamond particles, either natural or synthetic, bonded in a nickel matrix to the end of the core barrel. The technique of making such abrasive bonded material is well known to those skilled in the art.

Figure 2:
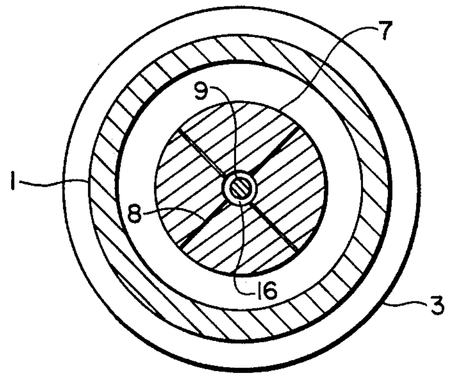
FIG. 2 is a horizontal section taken along the line A—A in FIG. 1.

Reference numeral 7 denotes a collet having the cross-sectional shape shown and having longitudinal slits 8 as indicated in both FIGS. 1 and 2. Reference numeral 9 denotes a center drill having an abrasive tip 10. This abrasive tip is also made of the same material as the abrasive edge 2 of core drill 1. Extension 11 is a threaded hollow cylinder which is held in a rotatable chuck (not shown) or other means for rapidly rotating hollow cylinder 11 and correspondingly core drill 1 and center drill 9. The collet 7 is generally cylindrical in shape and has an enlarged bulbous end 12. Tapered or beveled surface 13 corresponds in slope to the tapered surface 14 of extension 11. Tapered surface 15 of the bulbous section corresponds in slope to surface 5. The bore 16 of collet 7 slightly larger than the shank of drill 9. Vertical slits 8 are equally spaced around the bulbous portion and extend well up into the end portion of collet 7.

The tool is assembled by inserting the collet 7 into the core barrel 1 so that the tapered surface 15 of the collet 7 rests on the beveled edge 5. The drill 9 is then inserted into collet 7 and the core barrel 1 is screwed tightly onto the threaded extension 11. As the tapered end 14 of extension 11 contacts the tapered edge 13 of collet 7 the tapered surface 15 is pressed against shoulder edge 5 forcing the jaws of collet 7 to firmly grasp the shank of drill 9. When a rotary motion is applied to extension 11, the entire unit rotates and will cut the desired cylindrical core or bead with a centered hole when the assembly is applied to a section of stone, shell, glass, etc.

It will be readily apparent to those skilled in the art that the core and center drill apparatus of this invention possesses a number of advantages. The core drill can be made in a variety of diameters to cut beads of various desired sizes. Center drills of different sizes can be used, and the structure of the collet permits it to accommodate this variety of center drills. Accordingly various combinations of core drills and center drills are possible. The core drill can also be used alone.

I claim:

1. A core drill comprising:

a. a rigid hollow tube;
   1. having one end terminating in a bonded abrasive aggregate;
   2. having the other end threaded on the interior to correspond to the external threads on a hollow rotatable member; and
   3. having within its interior intermediate the ends a circular shoulder;

b. a hollow cylindrical collet shaped at one end to rest upon said shoulder of (a) and having means at the other end to fit within said rotatable member, said collet cooperating with said shoulder to thereby clamp a drill; and c. a rod-like drill terminating at one end in an abrasive aggregate and positioned at the other end in said collet.

2. A core drill comprising:

a. a rigid hollow tube;
   1. having one end terminating in a bonded abrasive aggregate;
   2. having the other end threaded on the interior to correspond to the external threads on a hollow rotatable member; and
   3. having within its interior, intermediate the ends, a circular shoulder whose interior edge is bevelled;

b. a hollow cylindrical collet, having a bulbous end bevelled to an angle corresponding to the bevelled edge of the interior circular shoulder within said rigid hollow tube and positioned upon said shoulder, and having means at the other end to fit within said rotatable member; and c. a rod-like drill terminating at one end in an abrasive aggregate and positioned at the other end in said collet.

3. The core drill of claim 2 wherein the bulbous portion of said collet is also bevelled at a location intermediate the ends of said collet at an angle corresponding to an interior-end bevel of said rotatable member.

4. The core drill of claim 3 including a rotatable member having one end rigidly fixed within the interior of said hollow tube and bearing against a bevelled surface on said collet.

* * * * *